(12) United States Patent
Karamfilov et al.

(10) Patent No.: US 9,526,980 B2
(45) Date of Patent: Dec. 27, 2016

(54) CLIENT SIDE PROCESSING OF GAME CONTROLLER INPUT

(71) Applicant: Microsoft Corporation, Redmond, WA (US)

(72) Inventors: Krassimir Emilov Karamfilov, Bellevue, WA (US); Emad Barsoum, Sammamish, WA (US); Charles Claudius Marais, Duvall, WA (US); John Raymond Justice, Bellevue, WA (US); David James Quinn, Seattle, WA (US); Roderick Michael Toll, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 152 days.

(21) Appl. No.: 13/723,652

(22) Filed: Dec. 21, 2012

(65) Prior Publication Data

US 2014/0179436 A1 Jun. 26, 2014

(51) Int. Cl.
*A63F 13/00* (2014.01)
*A63F 13/20* (2014.01)
*A63F 13/30* (2014.01)

(52) U.S. Cl.
CPC ............... *A63F 13/06* (2013.01); *A63F 13/12* (2013.01); *A63F 2300/1087* (2013.01); *A63F 2300/538* (2013.01); *A63F 2300/6045* (2013.01)

(58) Field of Classification Search
CPC .. A63F 13/12; A63F 13/06; A63F 2300/1087; A63F 2300/6045; A63F 2300/538
(Continued)

(56) References Cited

U.S. PATENT DOCUMENTS 5,838,909 A 11/1998 Roy et al.
6,038,599 A 3/2000 Black et al.
(Continued)

FOREIGN PATENT DOCUMENTS

EP 1640047 A1 3/2006
EP 1779909 A2 5/2007
(Continued)

OTHER PUBLICATIONS

Jurgelionis, et al., "Platform for Distributed 3D Gaming", In International Journal of Computer Games Technology—Special Issue on Cyber Games and Interactive Entertainment, vol. 2009, Article ID 231863, Jan. 2009, 15 pages.
(Continued)

*Primary Examiner* — Ronald Laneau
*Assistant Examiner* — Ross Williams
(74) *Attorney, Agent, or Firm* — Micah Goldsmith; Judy Yee; Micky Minhas

(57) ABSTRACT

Embodiments of the present invention enable rich control input data to control video games that are remotely executed. Rich control input includes three-dimensional image data, color video, audio, device orientation data, and touch input. A remotely-executed video game is one executed on a server or other computing device that is networked to a client device receiving the rich control input. Rich control input includes more data than can be uploaded to a game server without degrading game performance. Embodiments of the present invention preprocess the rich control data on the client and into data that may be uploaded to the game server. The rich input stream may be processed in a general way or in a game-specific way.

22 Claims, 10 Drawing Sheets

(58) Field of Classification Search
USPC .................................................. 463/36, 40–42
See application file for complete search history.

(56) References Cited

U.S. PATENT DOCUMENTS

| | | | |
|---|---|---|---|
| 6,377,257 | B1 | 4/2002 | Borrel et al. |
| 6,415,317 | B1 | 7/2002 | Yelon et al. |
| 6,884,172 | B1 | 4/2005 | Lloyd et al. |
| 7,587,520 | B1 | 9/2009 | Kent et al. |
| 7,603,406 | B2 | 10/2009 | Gulliver et al. |
| 7,887,416 | B2 | 2/2011 | Katsume et al. |
| 7,889,669 | B2 | 2/2011 | Abigail |
| 7,971,157 | B2 | 6/2011 | Markovic et al. |
| 8,038,535 | B2 | 10/2011 | Jensen |
| 8,092,307 | B2 | 1/2012 | Kelly |
| 8,151,199 | B2 | 4/2012 | Gerson et al. |
| 8,176,437 | B1 | 5/2012 | Taubman |
| 8,264,493 | B2 | 9/2012 | Peterfreund |
| 8,668,582 | B1 | 3/2014 | Overton |
| 8,888,592 | B1 | 11/2014 | Pereira et al. |
| 8,968,087 | B1 | 3/2015 | Gault et al. |
| 2002/0142843 | A1 | 10/2002 | Roelofs |
| 2004/0003039 | A1 | 1/2004 | Humphrey |
| 2004/0030882 | A1 | 2/2004 | Forman |
| 2004/0082388 | A1 | 4/2004 | Simsek et al. |
| 2004/0135805 | A1 | 7/2004 | Gottsacker et al. |
| 2004/0193813 | A1 | 9/2004 | Nguyen et al. |
| 2006/0135258 | A1 | 6/2006 | Maheshwari et al. |
| 2006/0281511 | A1 | 12/2006 | Holm et al. |
| 2007/0173325 | A1 | 7/2007 | Shaw et al. |
| 2007/0195097 | A1 | 8/2007 | Heesemans |
| 2007/0232396 | A1 | 10/2007 | Yoo |
| 2008/0037534 | A1* | 2/2008 | Shina ............................ 370/389 |
| 2008/0207322 | A1 | 8/2008 | Mizrahi |
| 2009/0094600 | A1 | 4/2009 | Sargaison et al. |
| 2009/0111574 | A1 | 4/2009 | Rowe |
| 2009/0111576 | A1 | 4/2009 | Ostergren et al. |
| 2009/0118019 | A1 | 5/2009 | Perlman |
| 2009/0119729 | A1 | 5/2009 | Periman et al. |
| 2009/0215538 | A1 | 8/2009 | Jew |
| 2009/0247295 | A1 | 10/2009 | Weldon |
| 2010/0197405 | A1 | 8/2010 | Douceur et al. |
| 2010/0229108 | A1 | 9/2010 | Gerson et al. |
| 2010/0304860 | A1 | 12/2010 | Gault et al. |
| 2010/0306813 | A1 | 12/2010 | Perry et al. |
| 2011/0025689 | A1 | 2/2011 | Perez |
| 2011/0055135 | A1 | 3/2011 | Dawson et al. |
| 2011/0086706 | A1 | 4/2011 | Zalewski |
| 2011/0088071 | A1 | 4/2011 | Yerli |
| 2011/0096089 | A1 | 4/2011 | Shenhav et al. |
| 2011/0145362 | A1 | 6/2011 | Jones et al. |
| 2011/0157196 | A1 | 6/2011 | Nave et al. |
| 2011/0210982 | A1 | 9/2011 | Sylvan et al. |
| 2011/0225040 | A1 | 9/2011 | Yerli |
| 2011/0250949 | A1 | 10/2011 | van Os et al. |
| 2011/0256912 | A1 | 10/2011 | Baynes et al. |
| 2012/0004039 | A1 | 1/2012 | Perry et al. |
| 2012/0004041 | A1 | 1/2012 | Pereira et al. |
| 2012/0004042 | A1 | 1/2012 | Perry et al. |
| 2012/0009997 | A1 | 1/2012 | Youm |
| 2012/0064968 | A1 | 3/2012 | Youm et al. |
| 2012/0064976 | A1 | 3/2012 | Gault et al. |
| 2012/0072911 | A1 | 3/2012 | Whaley et al. |
| 2012/0079095 | A1 | 3/2012 | Evans et al. |
| 2012/0299938 | A1 | 11/2012 | Iwasaki |
| 2013/0046893 | A1 | 2/2013 | Hauser et al. |
| 2013/0225287 | A1 | 8/2013 | Bronstein Bendayan et al. |
| 2013/0344966 | A1 | 12/2013 | Mustafa |
| 2014/0040970 | A1 | 2/2014 | Alexander et al. |
| 2014/0179421 | A1 | 6/2014 | Quinn et al. |

FOREIGN PATENT DOCUMENTS

| | | |
|---|---|---|
| EP | 2340877 A2 | 7/2011 |
| EP | 2340878 A2 | 7/2011 |
| WO | 99/32990 | 7/1999 |
| WO | 01/36061 | 5/2001 |
| WO | 2005/061068 | 7/2005 |
| WO | 2007119236 | 10/2007 |
| WO | 2012/107739 | 8/2012 |
| WO | 2012166305 A1 | 12/2012 |
| WO | 2013006802 | 1/2013 |
| WO | 2013023069 | 2/2013 |

OTHER PUBLICATIONS

Wang, et al., "Modeling and Characterizing User Experience in a Cloud Server Based Mobile Gaming Approach", In Proceedings of the 28th IEEE Conference on Global Telecommunications, Nov. 30, 2009, pp. 1-7.
Chen, et al., "Measuring the Latency of Cloud Gaming Systems", In Proceedings of the 19th ACM International Conference on Multimedia, Nov. 28, 2011, pp. 1269-1272.
Marzolla, et al., "Dynamic Resource Provisioning for Cloud-based Gaming Infrastructures", In Proceedings of the ACM Computers in Entertainment, vol. 9, No. 4, Article 39, Mar. 2011, 19 pages.
Kim, et al., "Multi-view Rendering Approach for Cloud-based Gaming Services", In The Third International Conference on Advances in Future Internet, Aug. 21, 2011, pp. 102-107.
PCT Search Report dated Oct. 31, 2013 re PCT/US2013/055234, 9 pages.
PCT App. No. PCT/US2013/051180, International Search Report and Written Opinion, dated Oct. 14, 2013, 13 pages.
Bhuvan Urgaonkar et al. Agile Dynamic Provisioning of Multi-Tier Internet Applications, ACM Transactions on Autonomous and Adaptive Systems, vol. 3, No. 1, Mar. 1, 2008 (Mar. 1, 2008), pp. 1-39, XP055081646.
Non-Final Office Action dated Feb. 5, 2014 re U.S. Appl. No. 13/593,843 (26 pages).
Notification of Transmittal of the International Search Report and the Writen Opinion of the International Searching Authority, or the Declaration in PCT/US2013/76871 mailed Mar. 13, 2014, 11 pages.
PCT Search Report dated Mar. 27, 2014 re Appl. No. PCT/US2013/076918 (11 pages).
Non-Final Office Action dated May 30, 2014 in U.S. Appl. No. 13/554,215, 14 pages.
International Search Report with Written Opinion mailed Jul. 31, 2014 in Application No. PCT/US2014/022712, 11 pages.
Machida F et al., Just-In-Time Server Provisioning Using Virtual Machine Standby and Request Prediction, Autonomic Computing, 2008, ICAC, 08, International Conference on, IEEE, Piscataway, NJ USA, Jun. 2, 2008(Jun. 2, 2008), pp. 163-171, XP031276805.
Shaikh A et al., On Demand Platform for Online Games, IBM Systems Jounral, IBM Corp., Armonk, New York, US, vol. 45, No. 1, Jan. 1, 2003, pp. 7-19, XP002492825.
Final Office Action dated Sep. 29, 2014 in U.S. Appl. No. 13/593,843, 14 pages.
Non-Final Office Action dated Sep. 30, 2014 in U.S. Appl. No. 13/723,498, 12 pages.
Notice of Allowance dated Oct. 20, 2014 in U.S. Appl. No. 13/554,215, 8 pages.
Dance Central Game Manual released Nov. 4, 2010, 12 pages.
International Search Report with Written Opinion mailed Aug. 5, 2014 in Application No. PCT/US2014/023096, 10 pages.
Components of a Multiplayer Game, Published on: Jul. 11, 2011, 7 pages, available at: http://www.jenkinssoflware.com/raknel/manual/multiplayergamecomponents.html.
Claypool, et al., "Latency Can Kill: Precision and Deadline in Online Games", In Proceedings of the First Annual ACM SIGMM Conference on Multimedia Systems, Feb. 22, 2010, pp. 215-222.
Bernier, Yahn W., "Latency Compensating Methods in Client/Server In-game Protocol Design and Optimization", In Proceedings of the 15th Games Developers Conference, Mar. 2001, 13 pages.
Shi, Shu, "Reduce Latency: The Key to Successful Interactive Remote Rendering Systems", In IEEE International Conference on Pervasive Computing and Communications Workshops, Mar. 21, 2011, 2 pages.

(56) References Cited

OTHER PUBLICATIONS

Winter, et al., "A Hybrid Thin-Client Protocol for Multimedia Streaming and Interactive Gaming Applications", In 16th International Workshop on Network and Operating Systems Support for Digital Audio and Video, Nov. 22, 2006, 7 pages.

Kunsemoller, et al., ""A Game-Theoretical Approach to the Benefits of Cloud Computing"", Retrieved on: Jan. 30, 2012, Available at: http://www.my-groups.de/gecon2011/publications/Kuensemoeller_GECON2011.pdf.

Day, Nathan, ""Building a True Real-Time Multiplayer Gaming Platform"", Published on: Oct. 11, 2011, Available at: http://blog.softlayer.com/2011/building-a-true-real-time-multiplayer-gaming-platform/.

Leung, et al., "Onlive Cloud Gaming Service", Published on: May 2011, 14 pages, SE 172/272 Enterprise Software, Available at: http://www.sjsu.edu/people/rakesh.ranjan/courses/cmpe272/s1/Team%20WS%20OnLive%20Cloud%20Gaming%20Service.pdf.

Final Office Action dated May 7, 2015 in U.S. Appl. No. 13/723,498, 9 pages.

Non-Final Office Action dated Apr. 10, 2015 in U.S. Appl. No. 13/593,843, 10 pages.

Non-Final Office Action dated Sep. 29, 2015 in U.S. Appl. No. 14/179,154, 14 pages.

Final Office Action dated Oct. 23, 2015 in U.S. Appl. No. 13/593,843, 16 pages.

Final Office Action dated Feb. 12, 2016 in U.S. Appl. No. 14/179,154, 14 pages.

Non-Final Office Action dated Mar. 11, 2016 in U.S. Appl. No. 14/180,043, 32 pages.

Non-Final Office Action dated Mar. 11, 2016 in U.S. Appl. No. 13/723,498, 8 pages.

Notice of Allowance dated Mar. 14, 2016 in U.S. Appl. No. 13/593,843, 8 pages.

Office Action Issued in European Patent Application No. 13742806.6, Mailed Date: Jun. 24, 2015, 3 Pages.

Non-Final Office Action dated Jun. 30, 2016 in U.S. Appl. No. 14/607,238, 5 pages.

\* cited by examiner

CLIENT SIDE PROCESSING OF GAME CONTROLLER INPUT

BACKGROUND

Video games, media consoles, appliances, and other computing devices may use controllers that generate rich inputs. For example, a depth camera may be used to generate a control signal for a video game. A depth camera generates a three-dimensional image of the space viewed by the camera. Player movement within the depth cloud may be detected and interpreted to manipulate a video game.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention enable rich control input to be used to control video games that are remotely executed. Rich control input includes three-dimensional image data, color video, audio, device orientation data, and touch input. A remotely-executed video game is one executed on a server or other computing device that is networked to a computing device receiving the control input. At least part of the video game image is rendered on the server and communicated to the client. For example, a game console may be networked with a game server using the Internet. The console receives controller input, which may be communicated to the game server. The game server executes the game code and manipulates it in accordance with the input and communicates a rendered game image or images back to the game console. In some embodiments, depth buffer data may also be included with the game image or images and used to generate a displayable image. The game console may then output the rendered image to a display.

Embodiments of the present invention pre-processes the rich sensory data on the client into data that may be uploaded to the game server. The rich input stream may be processed in a game-specific way or in a general way. Examples of client side processing of the rich input stream include generating skeletal tracking data, compression of a depth cloud image, subsampling, generating deltas, reduction to surfaces, reduction to geometry, and reduction to bounding boxes. A further reduction method is to isolate a motion blob within a depth cloud or video. Further, audio processing can be done on the client side and a game result sent to the game server.

The pre-processed rich input stream forms a reduced control input that comprises less data. Embodiments of the present invention communicate the reduced control input to the game server. The game server consumes the reduced control input to manipulate the game and generates a rendered game image that is communicated to the game client.

BRIEF DESCRIPTION OF THE DRAWINGS

Embodiments of the invention are described in detail below with reference to the attached drawing figures, wherein.

DETAILED DESCRIPTION

Figure 1:
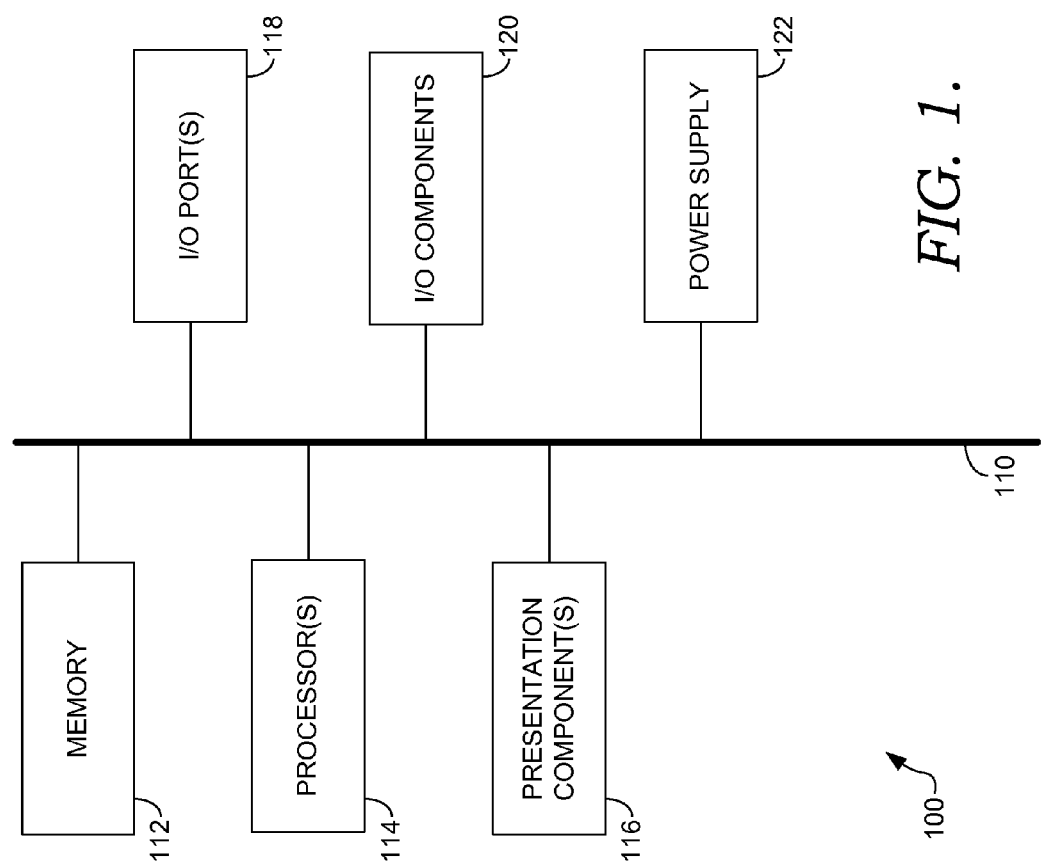
FIG. 1 is a block diagram of an exemplary computing environment suitable for implementing embodiments of the invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention enable rich control input to be used to control video games that are remotely executed. Rich control input includes three-dimensional image data, color video, audio, device orientation data, and touch input. A remotely-executed video game is one executed on a server or other computing device that is networked to a computing device receiving the control input. At least part of the video game image is rendered on the server and communicated to the client. For example, a game console may be networked with a game server using the Internet. The console receives controller input, which may be communicated to the game server. The game server executes the game code and manipulates it in accordance with the input and communicates a rendered game image or images back to the game console. In some embodiments, depth buffer data may also be included with the game image or images and used to generate a displayable image. The game console may then output the rendered image to a display.

Embodiments of the present invention pre-processes the rich sensory data on the client into data that may be uploaded to the game server. The rich input stream may be processed in a game-specific way or in a general way. Examples of client side processing of the rich input stream include generating skeletal tracking data, compression of a depth cloud image, subsampling, generating deltas, reduction to surfaces, reduction to geometry, and reduction to bounding boxes. A further reduction method is to isolate a motion blob within a depth cloud or video. Further, audio processing can be done on the client side and a game result sent to the game server.

The pre-processed rich input stream forms a reduced control input that comprises less data. Embodiments of the present invention communicate the reduced control input to the game server. The game server consumes the reduced control input to manipulate the game and generates a rendered game image that is communicated to the game client.

Having briefly described an overview of embodiments of the invention, an exemplary operating environment suitable for use in implementing embodiments of the invention is described below.

Exemplary Operating Environment

Referring to the drawings in general, and initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Embodiments of the invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component 120. Also, processors have memory. The inventors hereof recognize that such is the nature of the art, and reiterate that the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory 112 may be removable, nonremovable, or a combination thereof. Exemplary memory includes solid-state memory, hard drives, optical-disc drives, etc. Computing device 100 includes one or more processors 114 that read data from various entities such as bus 110, memory 112 or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in. Illustrative I/O components 120 include a microphone, joystick, game pad, satellite dish, scanner, printer, wireless device, etc.

Exemplary Online Gaming Environment

Figure 2:
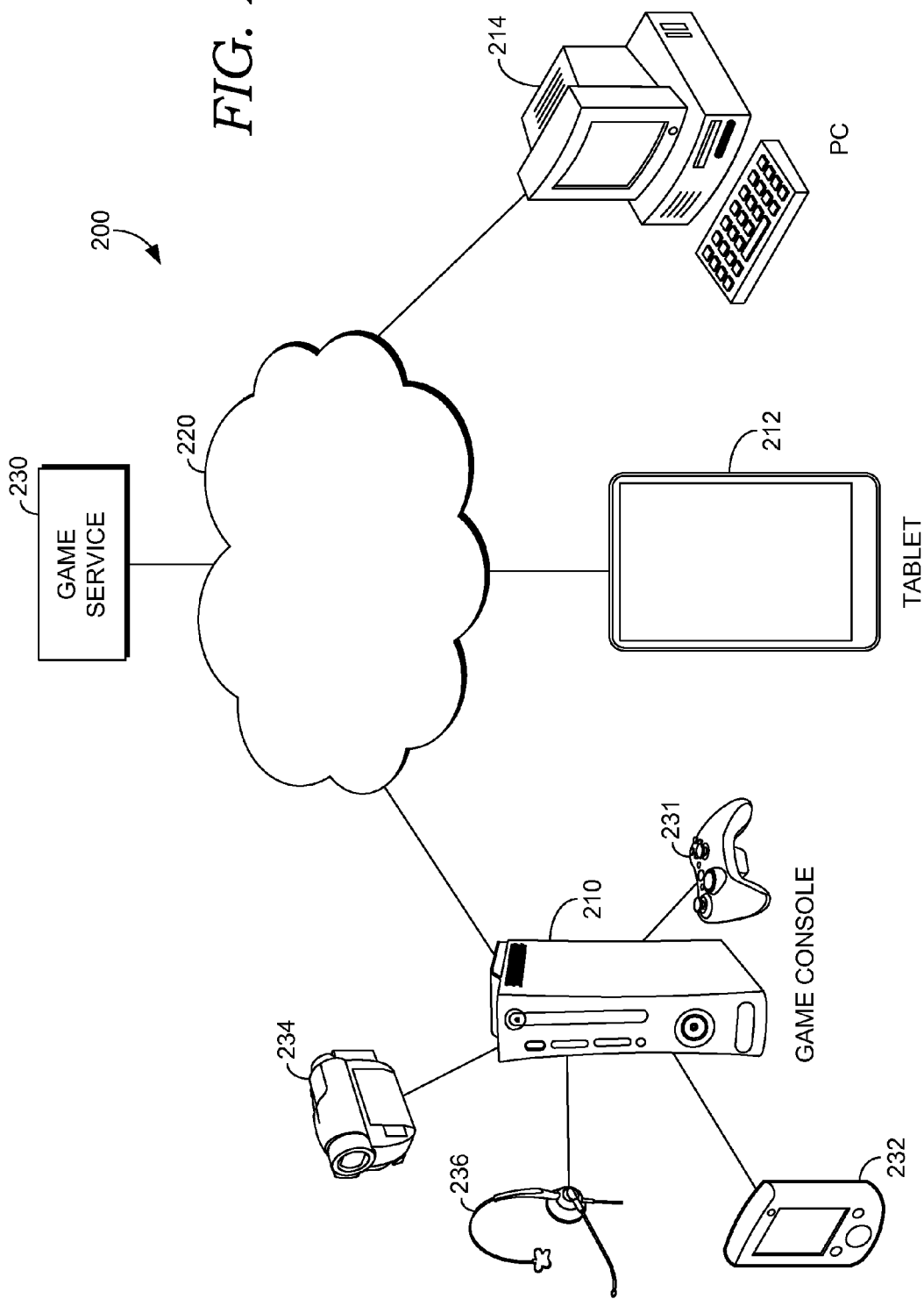
FIG. 2 is a diagram of online gaming environment, in accordance with an embodiment of the present invention.

Turning now to FIG. 2, an online gaming environment 200 is shown, in accordance with an embodiment of the present invention. The online gaming environment 200 comprises various game clients connected through a network 220 to a game service 230. Exemplary game clients include a game console 210, a tablet 212, and a personal computer 214. Use of other game clients, such as smart phones, are also possible. The game console 210 may have one or more game controllers communicatively coupled to it. In one embodiment, the tablet 212 may act as an input device for a game console 210 or a personal computer 214. In another embodiment, the tablet 212 is a stand-alone game client. Network 220 may be a wide area network, such as the Internet.

The controllers associated with game console 210 include game pad 230, tablet 232, headset 236, and depth camera 234. A game console may be associated with control devices that generate both a rich input and a basic input. Individual controllers are capable of generating different kinds of inputs and a single controller could generate both a rich input and an basic input.

The game pad 230 may be capable of generating basic control signals, such as those generated by button selections and joystick movement. Movement data such as that generated by accelerometers and gyros within the game pad 230 may be examples of rich sensory data. In some implementations, the movement data is not considered a rich sensory data.

The classification of an input stream as rich or basic depends on the latency caused to the game by uploading the full input stream. Factors such as available bandwidth and client capabilities may affect the classification. In one embodiment, an input device, or input that causes more than 80 ms of latency is classified as rich. Embodiments of the present invention may make a contextual determination of what constitutes a rich input for a particular game, under particular circumstances. Each game may have a latency sensitivity rating. The latency sensitive rating may be determined from user feedback collected from test groups, or though other method, and associated with the game. The latency sensitive rating may be different for different game features or set for the entire game. For example, avatar movement may be given a different sensitivity rating than background movement.

The rich or basic classification for each input stream may be determined by identifying the latency sensitivity rating for present game, determining available bandwidth, and determining client and server processing capabilities. The various factors may be combined to determine latency created for the input stream. If it is less than the latency sensitivity rating then the input stream is basic, if greater than the latency sensitivity rating then rich.

In an embodiment, the latency associated with an input stream is determined experimentally using a test instruction and test game response. The measured latency is used to determine whether the control is basic or rich.

When the control is determined to be rich via experimentation or calculation, then client side preprocessing of the input stream is brought on line. Various pre-processing method are described in more detail subsequently. If the control is basic, then it is uploaded without what this application considers pre-processing to avoid latency, but it may still be processed according to various transport protocols and other processing involved in communicating the control signal to the server. This other processing occurs to both pre-processed and unprocessed control signals.

The tablet 232 can be both a game controller and a game client as mentioned previously with tablet 212. Tablet 232 is shown coupled directly to the game console 210, but the connection could be indirect through the Internet or a subnet. In one embodiment, the game service 230 helps make a connection between the tablet 232 and the game console. The tablet 232 is capable of generating numerous input streams and may also serve as a display output mechanism. In addition to being a primary display, the tablet 232 could provide supplemental game information near information shown on a primary display coupled to the game console 210, or simply be a control surface. The input streams generated by the tablet 232 include video and picture data, audio data, movement data, touch screen data, and keyboard input data.

The headset 236, captures audio input from a player and the player's surroundings and may also act as an output device if it is coupled with a headphone or other speaker.

The depth camera 234 generates a depth cloud used as a control input. The depth camera 234 may an use infrared camera to determine a depth, or distance from the camera for each pixel captured. Stereoscopic depth cameras are also possible. In addition, the depth camera 234 may capture a typical color stream or picture. The depth camera 234 may have several image gathering components. For example, the depth camera 234 may have multiple cameras.

Game service 230 may comprise multiple computing devices communicatively coupled to each other. In one embodiment, the game service 230 is implemented using one or more server farms. The server farms may be spread out across various geographic regions including cities throughout the world. In this scenario, the game clients may connect to the closest server farms. Embodiments of the present invention are not limited to this setup.

The game service 230 allows the game to be executed within the computing devices provided by the game service 230. A communication session between the game service and game clients carries input traffic to the game service 230 and returns a rendered game image. In this embodiment, a computing device that is part of the game service executes the video game code using an input stream generated by input devices associated with the various game clients. The rendered video game is then communicated over the network to the game client where the rendered game is output for display.

Exemplary Game Client and Game Service for Remote Gaming

Figure 3:
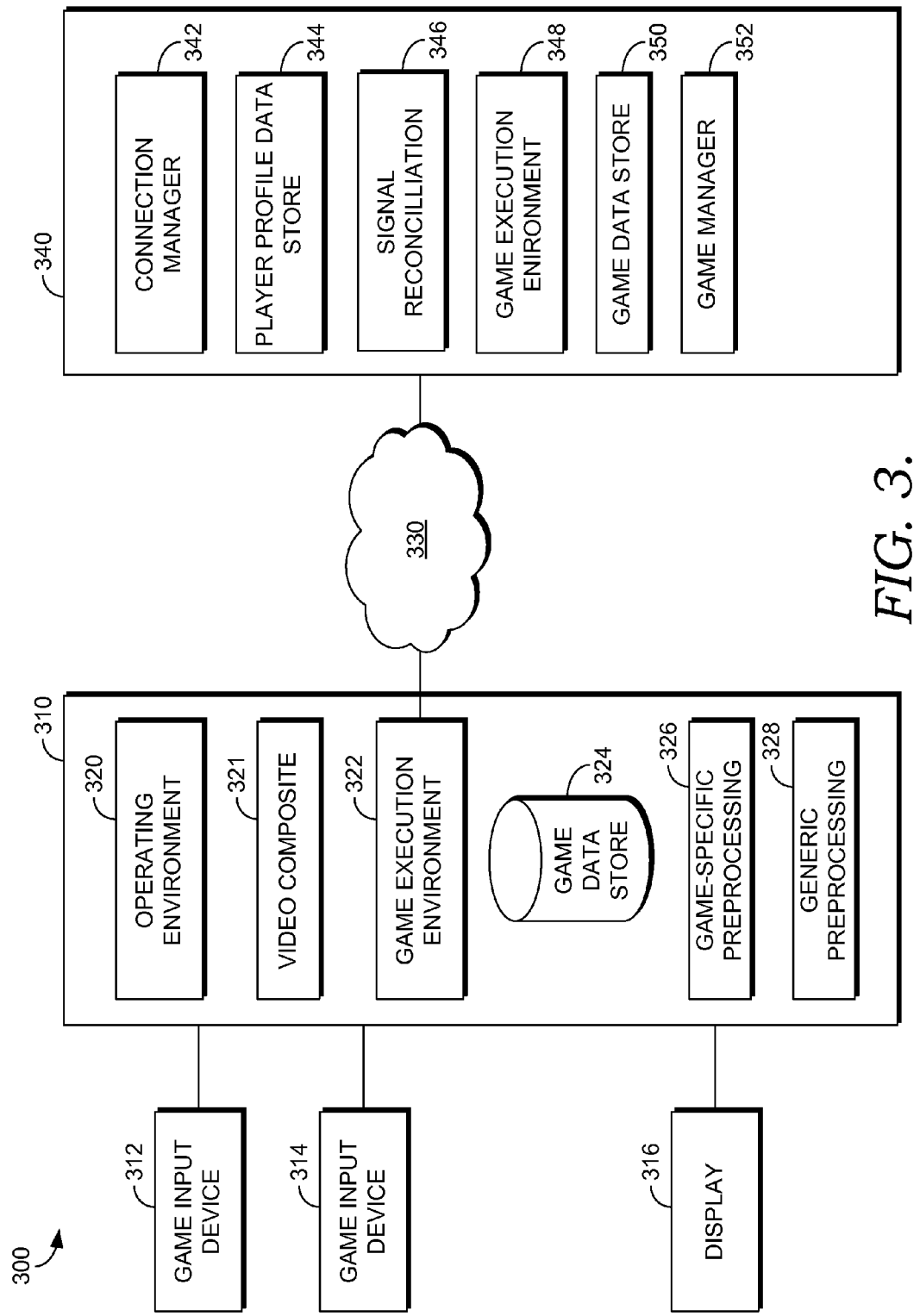
FIG. 3 is a diagram of a remote gaming computing environment, in accordance with an embodiment of the present invention.

Turning now to FIG. 3, an exemplary remote gaming environment 300 using rich input control data is shown, in accordance with an embodiment of the present invention. The game migration environment 300 includes a game client 310 communicatively coupled to a game server 340 through a network 330. In one embodiment, the network may be the Internet. The game client 310 is connected to a first game input device 312, a second game input device 314, and a display 316. Exemplary game input devices include game pads, keyboards, a mouse, a touch pad, a touch screen, a microphone for receiving voice commands, a depth camera, a video camera, and a trackball. Embodiments of the present invention are not limited to these input devices. The display 316 is capable of displaying video game content. For example, the display 316 may be a television or computer screen. In another embodiment, the display 316 is a touch screen integrated with the game client 310.

The game client 310 is a computing device that is able to execute video games. The game client 310 could be a tablet or a laptop computer. In another embodiment, the game client 310 is a game console and the display 316 is a remote display communicatively coupled to the game console. The game client 310 includes an operating environment 320, a video composite component 321, a game execution environment 322, a game data store 324, a game-specific processing component 326, and a generic pre-processing component 328.

The operating environment 320 may be provided by an operating system that manages the hardware and provides services to application running on the game client 310. The operating environment may allocate client resources to different applications as part of the pre-processing and other functions.

The game data store 324 stores downloaded games and partially downloaded games. Games may be downloaded in playable blocks. To play a game, the game may need to be loaded from the game data store 324 into active memory associated with the game execution environment 322. The game data store 324 may also store player progress files.

The game-specific processing component 326 processes a rich controller input to generate a reduced controller input. The reduced controller input can take many forms and can vary depending on the type of rich controller input involved.

When the rich control input is a three-dimensional video stream, the reduced controller input may take the form of skeletal tracking data, a reduction to surfaces, a reduction to geometry, deltas, compressed imagery, and a reduction to bounding boxes. Each of these will be described in more detail subsequently, but they all result in control data comprising less data to communicate to the controller. The reduced controller input is communicated over network 330 to the game execution environment 348 on the game server 340. The reduced controller input is used as an input that controls the game in progress.

The game-specific preprocessing 326 is specific to the particular game being executed. While the steps may be similar to the generic preprocessing described subsequently, a part of the game-specific processing is specific to a particular game. The code may be game specific to generate an output in a form that is consumable to the particular game. In other words, game specific code may be used to generate a compatible control signal. In other cases, the game specific code does something unique that other games do not do.

In one embodiment, the game-specific preprocessing generates a control input that is specific to the game. For example, a hand gesture could be interpreted to mean move the avatar right or to pick up an object in a first game, but something different in a second game. In this case, the reduced controller input would simply be a movement command instead of the depth cloud data. Interpreting depth cloud data to recognize a gesture and form a movement command is a transformation of one type of input data (depth data) to a second type (movement). In other embodiments, relevant control data is separated from irrelevant control data, but does not change form. For example, reduced controller input could be a portion of the depth cloud around an object of interest, for example a player's hand or face, without the rest of the depth cloud data. Isolating a portion of image data (3D or 2D) is described as a reduction to a bounding box. In the game-specific preprocessing of audio commands, the reduced controller input could be a unique game command or a common game command described in a game specific way, such as use of game specific slang.

In one embodiment, the game-specific processing component 326 is extracted or based on a video game originally written to be processed entirely on the client side. In this manner, the part of the video game that processes the rich controller inputs is separated and put on the client side and the commands for other game functions are sent up to the execution part of the game, which resides on the server 340. In this case, there may be a need to reconcile data that would have otherwise been processed instantaneously within the game execution environment on a client. The signal reconciliation component 346, explained in more detail subsequently, may perform this reconciliation.

The generic preprocessing 328 preprocesses the rich input in a way that is applicable to or consumable by multiple games. The reduced controller input generated by the generic processing component 328 is communicated over network 330 to the game execution environment 348 where it may be used to manipulate the game in progress. The examples of generic preprocessing steps include skeletal tracking, deltas, reduction to services, reduction to geometry, reduction to bounding boxes, and depth cloud compression. When the rich input includes audio signals the generic processing could be a speech-to-text translation. For example, the user could speak the word "pause" and the generic preprocessing could send a command to pause the game.

The game execution environment 322 comprises the gaming resources on the client 310 required to execute instances of a game or part of a game. In some embodiments, the client 310 does not include a game execution embodiment or the computing resources to execute the game. The game execution environment 322 comprises active memory along with computing and video processing. The game execution environment 322 receives gaming controls and causes the game to be manipulated and progressed according to its programming. In one embodiment, the game execution environment 322 outputs a rendered video stream that is communicated to the game client. In other embodiments, the game execution environment 322 outputs game geometry, or other representations, which may be combined with local objects on the gaming client to render the gaming video. The game execution environment 322 may execute part of a game to generate game images that are combined with rendered images received from the game server 340 by the video composite component 321

The video composite component 321 merges rendered video game images received from the game server 340 with rendered video game images rendered by the client 310 to form a single image that is output to display 316. Rendered video game images could refer to just a single color image or the color image and depth buffer data that is used to successfully composite server and client images. The video composite component may perform scaling and other functions to generate a video output that is appropriate.

The game server 340 comprises a connection manager 342, a player profile data store 344, a signal reconciliation component 346, a game execution environment 348, a game data store 350, and a game manager 352. Though depicted as a single box, the game server 340 could be a server farm that comprises numerous machines, or even several server farms.

The connection manager 342 builds a connection between the client 310 and the server 340. The connection manager 342 may also provide various authentication mechanisms to make sure that the user is authorized to access the game service provided by the server 340. The connection manager 342 may also analyze the bandwidth available within a connection and provide this information to components as needed. For example, the resolution of the video game image may be reduced to accommodate limited bandwidth.

The player profile data store 344 may work in conjunction with the connection manager 342 to build and store player information. Part of the player profile may comprise demographic and financial information such as a player's name, address and credit card information or other mechanism for paying for or purchasing games and experiences provided by the game service.

In addition, the player profile data store 344 may store a player's progress within an individual game. As a player progresses through a game, the player's score and access to game levels may be stored. Further, the player profile data store 344 may store information about individual player preferences such as language preferences. Information regarding a player's game client and speed of the network connection may also be stored and utilized to optimize the gaming experience. For example, in one embodiment, when a geographically proximate server farm is busy, players with higher latency Internet connections may be preferentially connected to proximate server farms while players with lower latency connections may be connected to server farms that are further away. In this way, the players with the network connections that are best able to handle the additional latency are connected to server farms that create additional latency because of their location.

The player profile data store 344 may also store a usage history for the individual player. A player's history of purchasing games, sampling games, or playing games through a game service that does not require the purchase of the games may be stored. The usage information may be analyzed to suggest games of interest to an individual player. In one embodiment, the purchase history may include games that are not purchased through the game service. For example, the purchase history may be augmented by the player entering in a key from a game purchased in a retail store. In some embodiments, the player may then have access to that game both on their game client 310 and through the game service.

The signal reconciliation component 346 may be present in some embodiments of the present invention. The signal reconciliation component 346 reconciles reduced controller input based on timing changes and other factors that occur as the signal is transported over a network. For example, the signal reconciliation component 346 may account for a latency generated by the time taken to transport the reduced controller input to the game execution environment 348. The signal reconciliation component may use a time stamp on the control signal to determine reconcile player actions with game actions. In another embodiment, all control signals are adjusted by 30 ms based on measured or calculated amount of time taken to communicate the signal from the client 310 to the game server 340. For example, the reconciliation component may adjust the signal to help determine whether a person hit another player based on the player's location at the time of the shot, not the time the control signal was received.

The game execution environment 348 comprises the gaming resources required to execute instances of a game. These are the resources described previously that are managed by the game manager 352 and other components. The game execution environment 348 comprises active memory along with computing and video processing. The game execution environment 348 receives gaming controls, such as reduced controller input, through an I/O channel and causes the game to be manipulated and progressed according to its programming. In one embodiment, the game execution environment 348 outputs a rendered video stream that is communicated to the game client. In other embodiments, the game execution environment 348 outputs game geometry, or other representations, which may be combined with local objects on the gaming client to render the gaming video.

The game data store 350 stores available games. The games may be retrieved from the data store and activated through an active memory. The game data store 350 may be described as passive or secondary memory. In general, games may not be played off of the game data store 350. However, in some embodiments, the secondary memory may be utilized as virtual memory, in which case portions of the game data store 350 may also serve as active memory. This illustrates that active memory is not necessarily defined by a particular hardware component, but is defined by the ability of the game resources to actively manipulate and access objects within the memory to execute the game.

The game manager 352 manages players' connections into active games. In one embodiment, there are individual game managers for each game available through the game service. Taking a single game as an example, the game manager will drop players into requested games. The game manager 352 also manages active games. In one embodiment, a player may connect to a game through the game manager 352. In other words, the game manager 352 may act as a gatekeeper for communications and connections between individual game instances. When a player drops out of a game, an instruction may go to the game manager to retrieve and save the player's progress into the player's profile within player profile data store 344. Once a player drops out of a game, the game may be shut down by the game manager 352.

Figure 4:
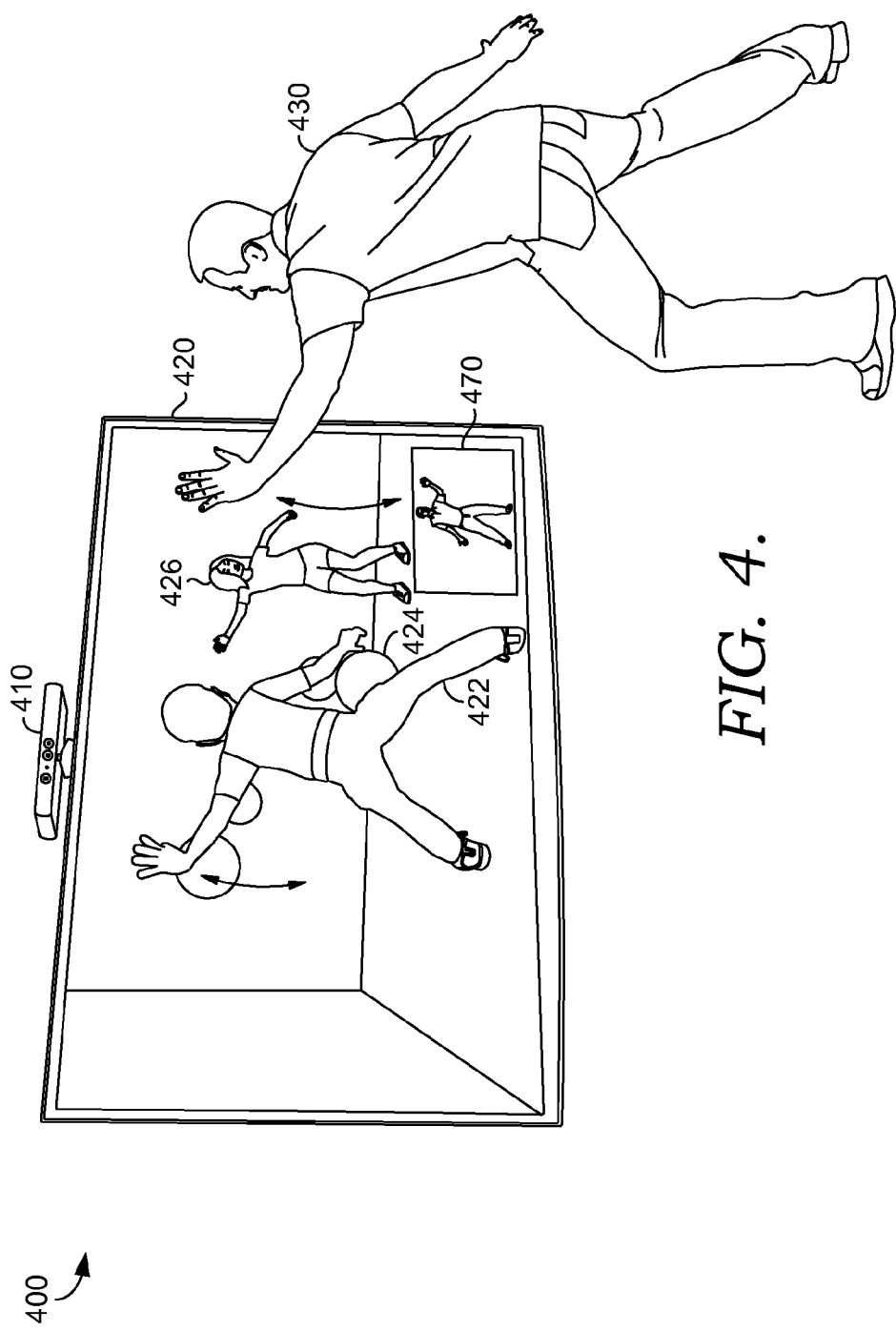
FIG. 4 is a diagram of a gaming interface generated using a depth camera, in accordance with an embodiment of the present invention.

Turning now to FIG. 4, an exemplary depth camera interface is shown, in accordance with an embodiment of the present invention. The depth camera 410 has a view of the player 430. A depth camera 410 generates a depth cloud that describes a players size, shape, and orientation at a point in time. As the depth cloud changes over time, the player's 430 movement may be determined. The user's movements are able to form a control input. In this case, the player 430 is moving their left arm up and down. A game console or game server receives the input from the depth camera 410 and uses it to manipulate the avatar 422 shown on display 420. As can be seen, the movements of the avatar 422 interact with virtual objects 424 and a second player 426. A different person connected to the same game session in the game server may control the second player 426. In this case, the virtual objects 424 are balls.

FIG. 4 also includes a picture-in-picture ("PIP") image 470 of the player 430. This may be a standard video image captured by the depth camera 410 or some other camera. The PIP image may be rendered on the client without sending the image to the game server.

Figure 5:
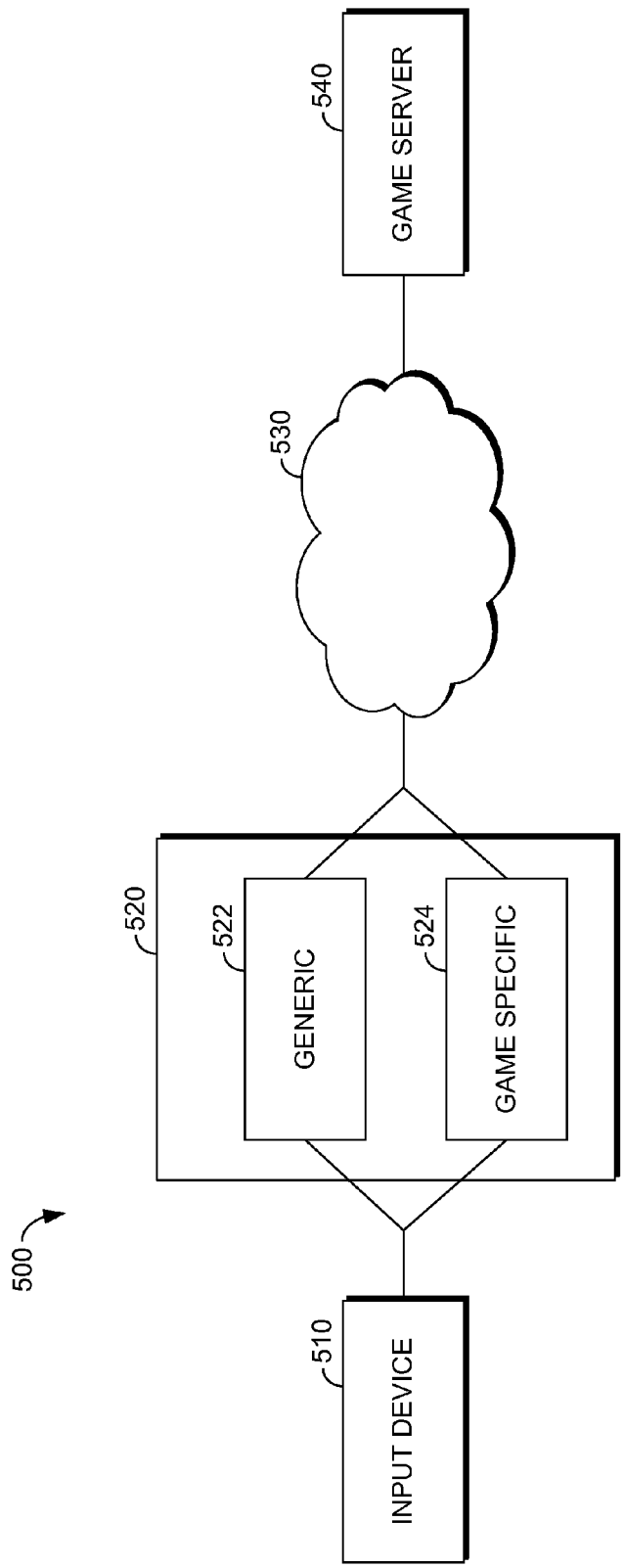
FIG. 5 is diagram illustrating client side processing of rich controller input, within a network gaming environment, in accordance with an embodiment of the present invention.

Turning now to FIG. 5, client side processing of rich controller input, within a network gaming environment 500, is shown, in accordance with an embodiment of the present invention. Gaming environment 500 includes input device 510, client 520, network 530, and game server 540. These components may be similar to the components described previously with reference to FIG. 3.

The input device 510 generates a rich controller input, such as a depth cloud. The game server 540 executes game code and generates a rendered video game image responsive to the control input. The input generated by input device 510 is preprocessed by a generic processing component 522 and by a game-specific processing component 524. The generic processing component 522 generates a reduced controller input that is communicated to the game server 540 over network 530. The rich controller input is also processed by the game-specific processing component 524 and likewise communicated over network 530 to game server 540.

In different embodiments, a game may rely only on a generic preprocessing 522 or on only a game-specific processing 524 or on a combination of both. In another embodiment, generic preprocessing may occur and be consumed by game-specific processing 524 for further refinement before a reduced controller input is communicated to the game server 540. The game server 540 has code to process the reduced controller input whether received from the generic processing component 522 or the game-specific processing component 524. The gamer server 540 uses the reduced controller to manipulate a game and generate a rendered video game image that is communicated to the client 520.

Figure 6:
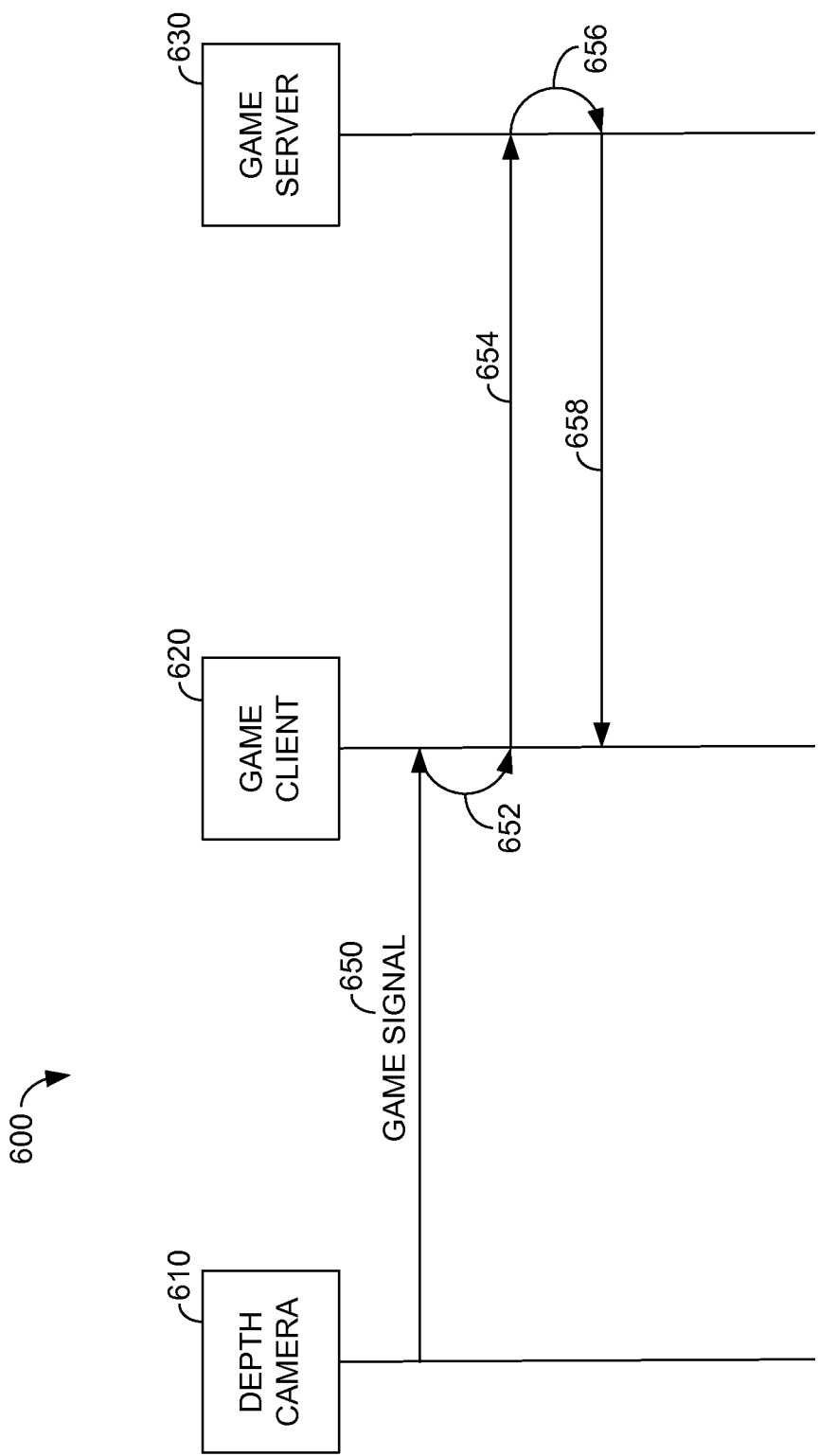
FIG. 6 is a sequence diagram illustrating client side processing of a game signal, in accordance with an embodiment of the present invention.

Turning now to FIG. 6, a sequence diagram illustrating client side processing of a game signal is shown, in accordance with an embodiment of the present invention. The sequence diagram includes a depth camera 610, a game client 620, and a game server 630. The game code is executed on the game server 630. The game may be a multiplayer video game or single player game. The game client 620 may be capable of executing a game, but is not doing so in this example. Instead, the game client 620 is preprocessing the game signal and communicating a reduced version of the game signal to the game server.

Initially, an input signal 650 is received by the game client 320 from the depth camera 610. The game client 620 preprocesses the input signal 650 at step 652. The preprocessing may be game-specific or a generic. Generally speaking, generic preprocessing may be consumed by different games running on the game server 640. On the other hand, game-specific preprocessing is unique to an individual game running on the game server 640. When the online gaming session is initiated, the game server 640 may download game-specific preprocessing code to the game client 620. In one embodiment, the game-specific processing code is modularized from a game designed to run entirely on a client without involvement from a game server. The game-specific code may operate to generate game specific commands, or refine environmental data in a way to make it consumable by the game running on the game server 640.

Examples of the processing 652 include generating a skeleton or skeletal tracking data. A skeleton is a stick figure representation of an individual appearing in the depth cloud image. Skeletal tracking describes the person's movements with the person's joints and limbs and body reduced to lines or geometric shapes. Other examples of preprocessing will be described in more detail subsequently. The preprocessed signal data 654 is communicated to the game server 630. The preprocessed signal 654 is consumed 656 by the game server 630 to change the game state and render a new video game image that depicts the new game state. The rendered image 658 is communicated over a network to the game client 620 which then outputs the rendered video game image for display.

Figure 7:
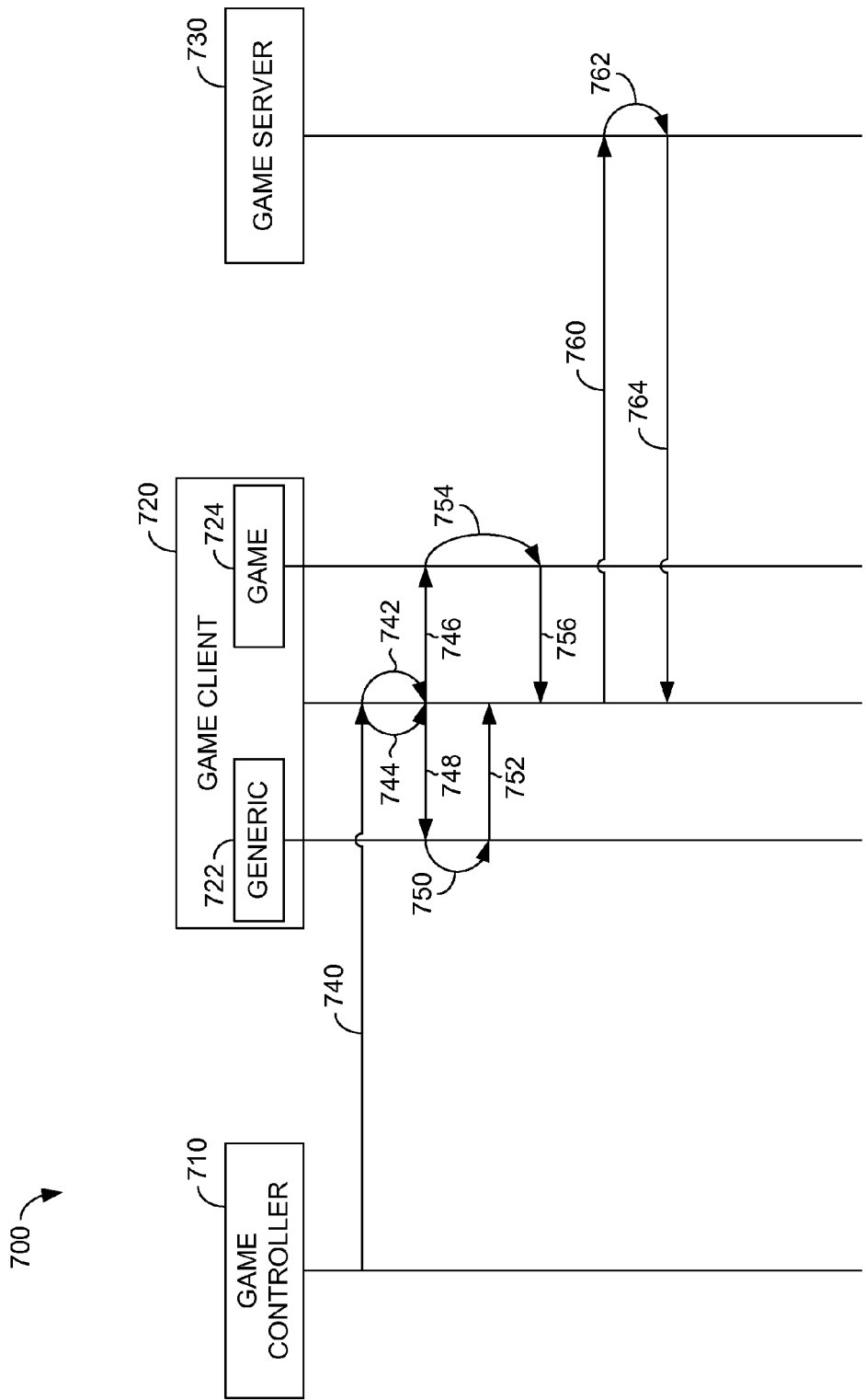
FIG. 7 is a sequence diagram illustrating the interplay of generic preprocessing and game-specific preprocessing in a network gaming environment, in accordance with an embodiment of the present invention.

Turning now to FIG. 7, a sequence diagram illustrating the interplay of generic preprocessing and game-specific preprocessing in a network gaming environment 700 is shown, in accordance with an embodiment of the present invention. In FIG. 7, the game controller 710 generates a rich input. Exemplary game controllers 710 include a depth camera, a video camera, an audio device, and movement sensitive controllers. The game client 720 is a computing device capable of outputting a video image to a video display. The game client 720 need not be a dedicated game client, but could be a personal computer, tablet, or other similar device. The game client 720 includes generic preprocessing 722 and game-specific preprocessing 724. The game-specific preprocessing 724 is associated with a game currently being executed by game server 730.

Initially, a rich input 740 is communicated to the game client 720. At step 742, the game client identifies at least a portion of the rich input 740 to be sent to the to the generic processing component 722. The controller input 748 is communicated to the the generic processing component 722. At step 744 all or a portion of the rich input 740 is communicated 746 to the game-specific processing component 724.

At step 750, the generic processing component 722 utilizes the data received to generate a reduced controller input 752. The reduced controller input 752 may be a skeletal geometry for people appearing within the rich controller input. The reduced controller input 752 could be an identification of players within an image. The reduced controller input 752 is communicated to a game client transport component (not shown).

The game-specific processing component 724 preprocesses the input at step 754 to generate a reduced controller input 756 that is communicated back to the game client transport component (not shown). The game-specific preprocessing 724 could be a reduction to a bounded area. In one example, the game-specific processing component 724 uses a skeletal geometry generated by the generic processing component 722 to identify the area around a hand. The rich controller input corresponding to just the area around the hand forms the reduced controller input. As mentioned, other types of reduced controller input may be generated by either the generic processing component 722 or the game-specific processing component 724.

Either way, the reduced controller input 752 received from the generic processing component 722 and the reduced controller input 756 received from the game-specific processing component 724 are communicated as a reduced controller input 760 to the game server 730. The game server 730 uses the reduced controller input 760 to manipulate the executed game and to generate a rendered video at step 762. The rendered video game image 764 is communicated back to the game client 720 where it is output to a display.

Figure 8:
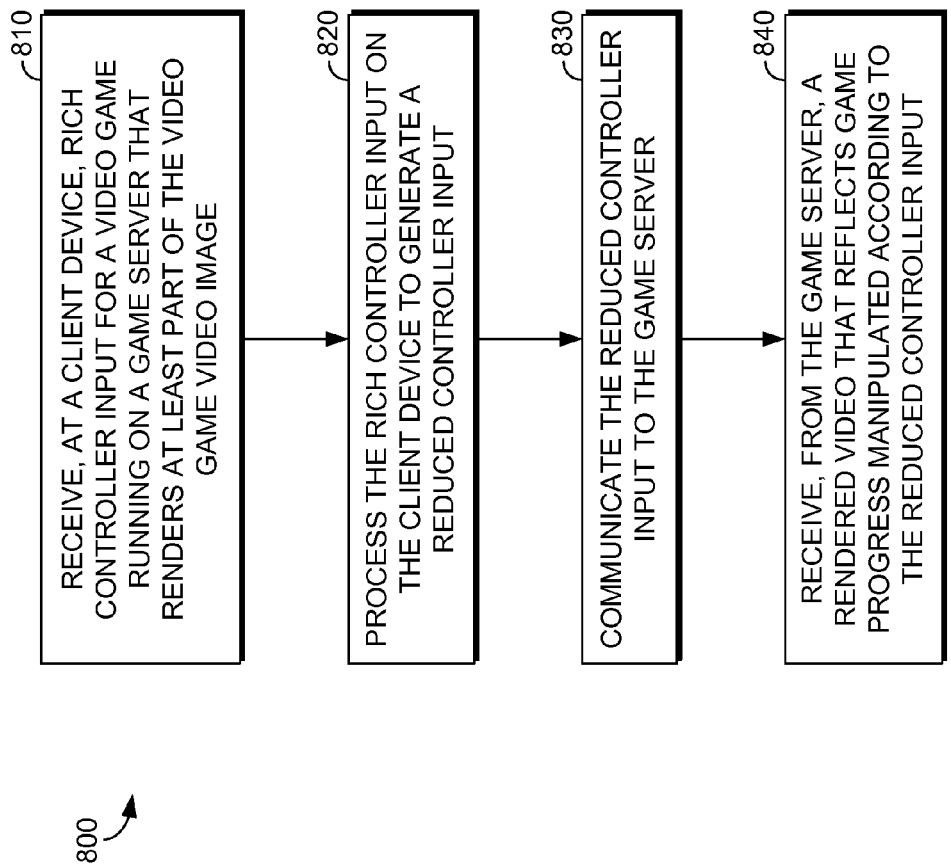
FIG. 8 is a flow chart showing a method of enabling game play over a remote connection using a data rich input device, in accordance with an embodiment of the present invention.

Turning now to FIG. 8, a method 800 of enabling game play over a remote connection using a data rich input device is shown, in accordance with an embodiment of the present invention. The remote game play may be similar to that described previously with reference to FIG. 2 or FIG. 3 or elsewhere. The rich input device may be a depth camera, audio component, a touch-screen device, or a movement-sensitive device that generates accelerometer or gyroscopic data. Other types of rich input devices may be possible. Generally speaking, a rich input is one that includes more information than can be uploaded without degrading the game play because of latency, which manifests as a delayed reaction to controller input. In one embodiment, an input stream taking more than 50 ms to communicate to the game server is considered rich.

At step 810, rich controller input for a video game running on a game server is received at a client device. The game server renders at least a part of the video game image and communicates it back to the client device over the network. This is in contrast to other network gaming scenarios where game geometry or player movement information is communicated from a network to a client device, which then renders a video game image. In this case, the video game image is rendered by the server.

At step 820, the rich controller input is processed on the client device to generate a reduced controller input. The reduced controller input includes less data than the rich controller input and is uploadable to the server within a time frame that does not degrade game play. As mentioned previously, the reduced controller input could be specific to the game being executed on the server or could be generic. A rich control input that depicts players includes a video image and a three-dimensional point cloud data, such as is generated by a depth camera. Skeletal tracking is one form of reduced input control formed from image data. Skeletal tracking information describes movements of a person in terms of their joints and limbs and body but may not include significant image data. Skeletal tracking may just communicate changes to the person upon evaluating the received controller input.

Another form of reduced controller input is player identification data. The player identification data describes which player is where within the image and may differentiate players from observers. This information may likewise be communicated to the server. The player identification information may also include a determination of which player is the active player at a given time.

Another form of reduced controller input is a product of signal reduction. Examples of signal reduction include compression and sampling. Sampling uploads every X frame of data received. For example, every 5th frame of data received could be uploaded within a sampling process rather than uploading every frame of data received. A frame refers to an image taken at a point in time, whether the image is a two-dimensional video image or a three-dimensional point cloud.

Deltas are an additional form of a reduced controller input. A delta can take many different forms, but each describes a change in the environment instead of the entire environment. For example, the change in location of an object in the room may be described as an object delta. The change in a player through movement may be described as a player delta, perhaps in skeletal form. Other forms of deltas are possible. The delta may be communicated in a form of image or depth data that describes the movement. In other words, only the portion of the depth cloud that has changed may be uploaded. In another embodiment, only relevant changes or changes deemed relevant by the pre-processing are uploaded. For example, changes to game observers may be ignored while changes surrounding the players or an active player may be used to form a delta.

Reduction to surfaces is another form of reduced controller input. A reduction to surfaces consumes depth data to generate a series of geometric shapes that form planes along the surface of objects. Those surfaces may be associated with colors of the object and allow an estimation of the depth to be uploaded. Reduction to geometry may be similar. A surface or geometric shape can be defined in very few mathematical equations compared to raw depth data. For example, when identifying a floor plane, the floor plane can be described as $ax+by+cz=d$, so just the four numbers for a, b, c, and d need to be sent to the server instead of the 3 d depth data. However, as used in this description, the reduction to geometry focuses on an object-by-object basis rather than surfaces. In other words, in reduction to geometry a couch may be described as a single object rather than broken into a series of planes.

An additional form of reduced controller input include isolated depth data. Isolated depth data describes only a portion of the depth cloud that is of interest to the game. The part of the depth cloud that is of interest may vary from game to game. For example, one game may be interested in a player's hands and feet while another game is interested in a face or game object, such as a tennis racket held by a player. In one embodiment, skeletal tracking information is used to isolate the relevant depth data. The skeletal tracking information is first used to generate a portion of the body that is of interest and then the depth data associated with this part of the skeleton forms the reduced input control. Conceptually, the skeletal tracking process is reversed in part. The skeleton takes depth cloud data as input and analyzes it to identify people and body parts. Once the body part of the skeleton is identified, the related depth cloud data may be associated with the body part.

Motion blobs are a form of reduced input control. A motion blob is the image or depth data associated with a moving object. The motion blob could either be an outline or a carve-out. The motion blob in outline form includes data that describes the outline of the moving object without including all of the interior of the object. The carve-out includes the data describing the moving object, including the interior, but without background data.

All of the previously-mentioned reduced controller inputs relate to image or three-dimensional image data. Reduced controller inputs for audio data include speech-to-text data and game controls directly derived from processing the audio data. For example, a pause command could be the reduced input control generated in response to detecting the word "pause" within the audio stream.

Touch-screen and motion data could similarly be interpreted to generate a game command. An example game command is "move player right three steps at a designated velocity" that corresponds to the input data. Orientation information could be interpreted to translate the game player in the direction indicated. These commands could be pre-processed and form reduced controller input instead of uploading the raw movement or touch-screen data received from the game controller.

At step 830, the reduced controller input is communicated to the game server. For example, the reduced controller input could be communicated over the Internet from the game client to the game server. In one embodiment, the reduced controller input is communicated and the raw controller input is not communicated to the game server. At step 840, a rendered video is received from the game server. The rendered video reflects game progress manipulated according to the reduced controller input communicated previously at step 830.

Figure 9:
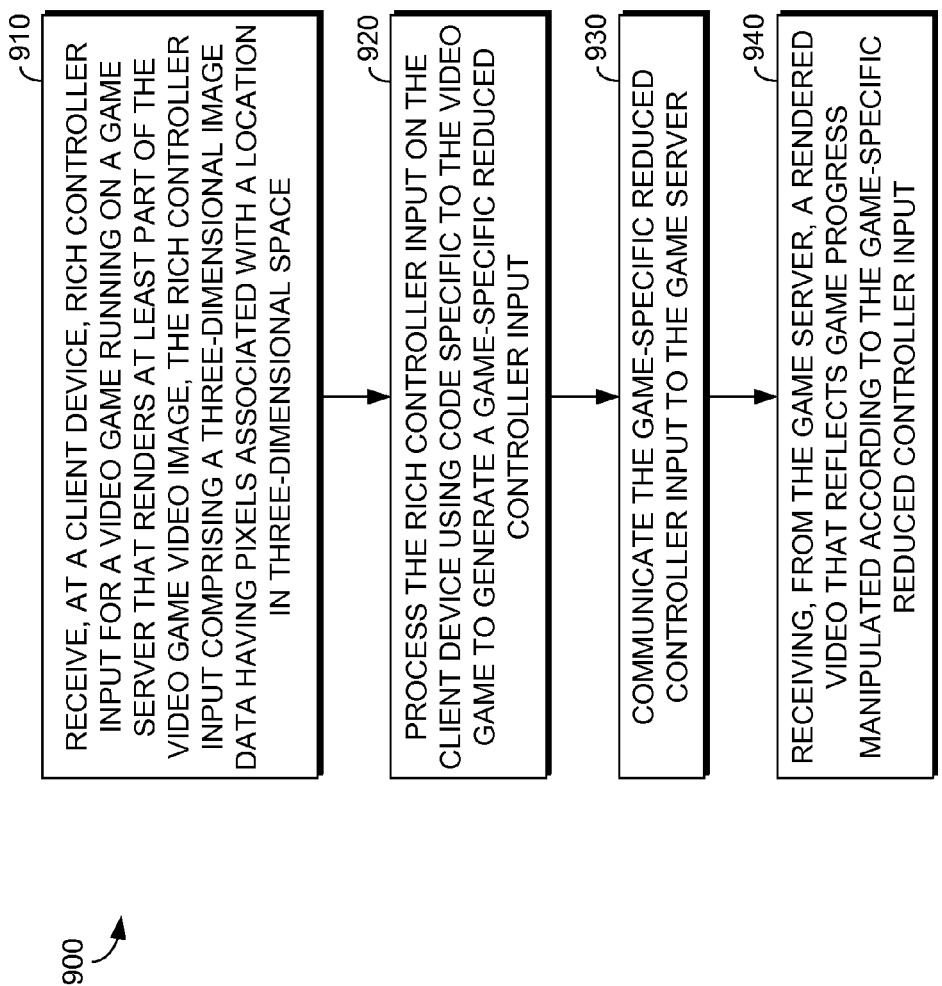
FIG. 9 is a flow chart showing a method of enabling game play over a remote connection using a data rich input device, in accordance with an embodiment of the present invention.

Turning now to FIG. 9, a method 900 of enabling game play over a remote connection using a data rich input device is shown, in accordance with an embodiment of the present invention. At step 910, rich controller input for a video game is received at a client device. The controller input is for a video game running on a game server that renders at least part of the video game image. The rich controller input comprises a three-dimensional image data having pixels associated with a location in three-dimensional space. The three-dimensional image data may be generated by a depth camera that uses infrared data to ascertain a depth in space. Sonar or other equivalent technology may also be used to determine an object's depth in space and to generate a depth cloud.

At step 920, the rich controller input is processed from a client device using codes specific to the video game to generate a game-specific reduced controller input. The game-specific reduced controller input may be similar to the reduced controller inputs described previously with reference to FIG. 8 and elsewhere. At step 930, the game-specific reduced controller input is communicated to the game server.

At step 940, a rendered video that reflects game progress manipulated according to the game-specific reduced controller input is received from the game server. The rendered video may be output to a display device associated with the game client. In one embodiment, generic reduced controller input is also generated at the game client and communicated to the server in combination with the game-specific reduced controller input. Generally, the generic input is not specific to a particular game and instead may be used in association with multiple games running on the server. The game-specific code is specific to the game running on the server and will not serve other games. In one embodiment, the game-specific code used to preprocess the rich control input is downloaded to the client device from the server upon initiation of the network gaming session. The preprocessing code may then be erased from a client when the game session concludes.

Figure 10:
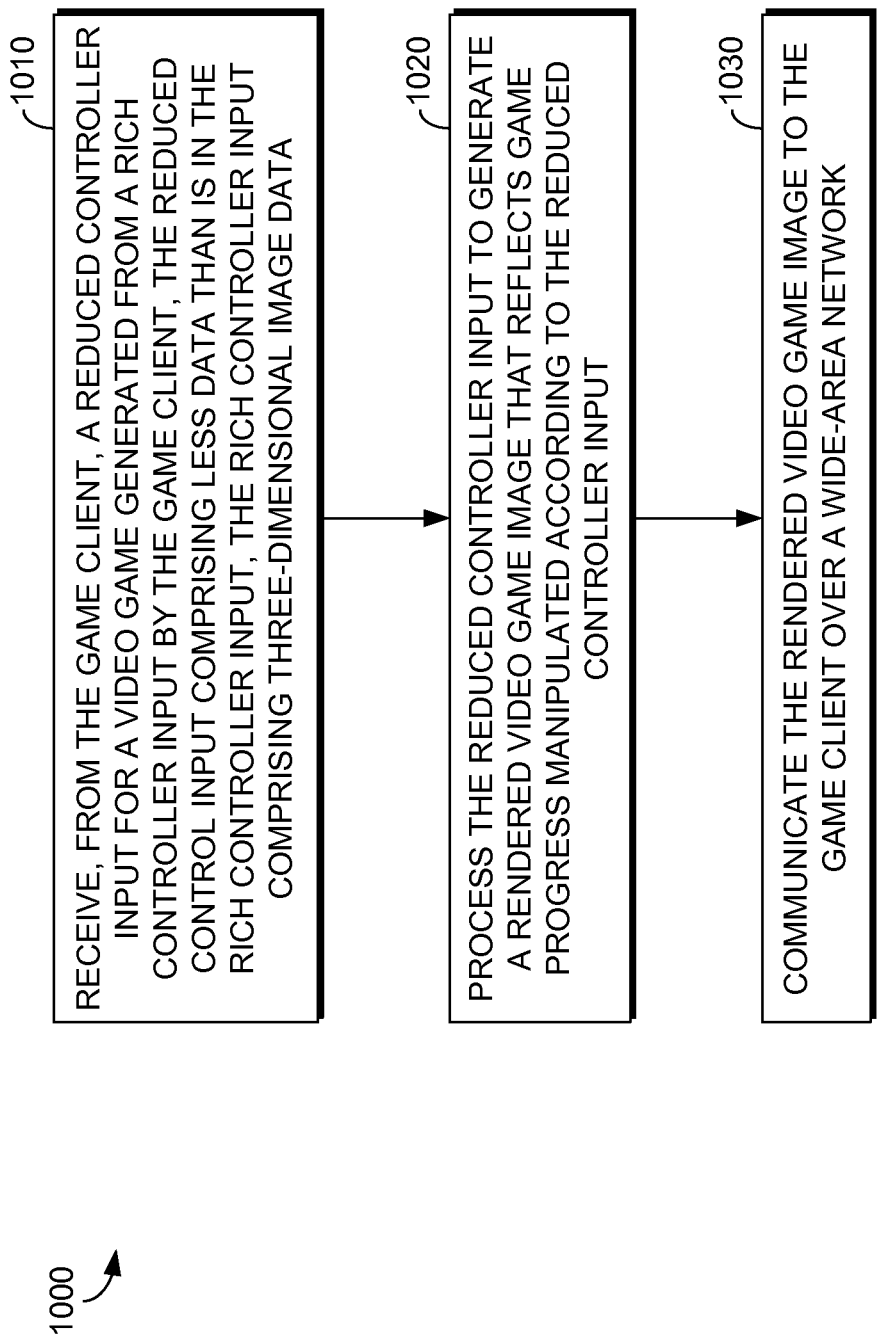
FIG. 10 is a flow chart showing a method of enabling game play over a remote connection using a data rich input device, in accordance with an embodiment of the present invention.

Turning now to FIG. 10, a method 1000 of enabling game play over remote connection using a data rich input device is shown, in accordance with an embodiment of the present invention. Method 1000 may be performed by a game server receiving input from a game client.

At step 1010, a reduced controller input is received from a game client. The reduced controller input is generated from a rich controller input received by the game client. The reduced controller input comprises less data than is in the rich controller input. The rich controller input comprises three-dimensional image data. The types of reduced controller input have been described previously with reference to FIG. 8 and elsewhere.

At step 1020, the reduced controller input is processed by the game server to generate a rendered video game image that reflects game progress manipulated according to the reduced controller input. At step 1030, the rendered video game image is communicated to the game client over a wide-area network.

Embodiments of the invention have been described to be illustrative rather than restrictive. It will be understood that certain features and subcombinations are of utility and may be employed without reference to other features and subcombinations. This is contemplated by and is within the scope of the claims.

The invention claimed is:

1. A method of enabling game play over a remote connection using a data input device, the method comprising:
receiving, at a client device from a camera, initial controller input for a video game running on a game server that renders at least part of the video game video image, the initial controller input comprising three-dimensional image data;
processing the initial controller input on the client device to generate a reduced controller input, wherein the reduced controller input is an environmental delta for objects in an environment described by the three-dimensional image data within the initial controller input, the environmental delta describing changes to an inanimate object in the environment, wherein the initial control input comprises more data than the reduced controller input;
communicating over a wide area network the reduced controller input to the game server; and
receiving, from the game server, a rendered video that reflects game progress manipulated according to the reduced controller input.

2. The method of claim 1, wherein the processing is performed with code specific to the video game being played.

3. The method of claim 1, wherein the method further comprises not communicating the entire initial controller input to the server.

4. The method of claim 1, wherein the reduced controller input further comprises skeletal geometry for a person described by three-dimensional image data within the initial controller input.

5. The method of claim 1, wherein the reduced controller input further comprises a game command derived by recognizing a gesture described by three-dimensional image data within the initial controller input.

6. The method of claim 1, wherein the initial controller input further comprises an audio signal and the method further comprises performing speech to text translation on the audio signal and communicating the text to the game server.

7. The method of claim 1, wherein the reduced controller input further comprises a motion blob for an object described by three-dimensional image data within the initial controller input, the motion blob describing one or more of an outline or carve out of moving objects in the environment.

8. The method of claim 1, wherein the reduced controller input further comprises a subset of data describing only a portion of a scene that is described by the three-dimensional image data within the initial controller input, the subset describing an object of interest to be analyzed by the video game running on the game server.

9. The method of claim 1, wherein the initial controller input is a point cloud.

10. A computing system comprising:
a processor; and
computer storage memory having computer-executable instructions stored thereon which, when executed by the processor, configure the computing system to:
receive from a camera initial controller input for a video game running on a game server that renders at least part of the video game video image, the initial controller input comprising a three-dimensional image data having pixels associated with a physical location in three-dimensional space viewed by the camera;
process the initial controller input using code specific to the video game to generate a game-specific reduced controller input, wherein the initial control input comprises more data than the game-specific reduced controller input;
communicate over a wide area network the game-specific reduced controller input to the game server;
process the initial controller input using system code to generate a generic reduced controller input, wherein the generic reduced controller input is an environmental delta for objects in an environment described by three-dimensional image data within the initial controller input, the environmental delta describing changes to an inanimate object in the environment wherein the initial control input comprises more data than the generic reduced controller input; and
communicate over the wide area network the generic reduced controller input to the game server; and
receive over the wide area network from the game server, a rendered video that reflects game progress manipulated according to the game-specific reduced controller input and the generic reduced controller input.

11. The computing system of claim 10, wherein the reduced controller input is a game command derived by recognizing a gesture described by three-dimensional image data within the initial controller input.

12. The computing system of claim 11, wherein the game-specific reduced controller input is a subset of the three-dimensional image data describing only a portion of a scene that is described by the three-dimensional image data, the subset describing an object of interest to be analyzed by the video game running on the game server.

13. The computing system of claim 12, wherein the subset is identified on the client using a skeletal geometry for a person described by the three-dimensional image data.

14. The computing system of claim 10, wherein the initial controller input further comprises an audio signal and the method further comprises performing speech to text translation on the audio signal and communicating the text to the game server.

15. The computing system of claim 10, wherein the generic reduced controller input is a player identification for a person described by the three-dimensional image data.

16. The method of claim 10, wherein the initial controller input is a point cloud.

17. The computing system of claim 10, further configured to:
process the initial controller input on the client device using system code to generate a generic reduced controller input, wherein the initial control input comprises more data than the generic reduced controller input;
communicate over the wide area network the generic reduced controller input to the game server; and
receive, from the game server, a rendered video that reflects game progress manipulated according to the game-specific reduced controller input and the generic reduced controller input.

18. The computing system of claim 17, wherein the generic reduced controller input is a skeletal geometry for a person described by the three-dimensional image data and wherein the game-specific reduced controller input is a subset of the three-dimensional image data describing only a portion of a scene that is described by the three-dimensional image data, the subset describing an object of interest to be analyzed by the video game running on the game server.

19. The computing system of claim 18, wherein the subset is identified on the client using the skeletal geometry for a person described by the three-dimensional image data.

20. A computing system comprising:
a processor; and
computer storage memory having computer-executable instructions stored thereon which, when executed by the processor, configure the computing system to:
receive at a client device from a camera, initial controller input for a video game running on a game server that renders at least part of the video game video image, the initial controller input comprising a three-dimensional image data having pixels associated with a physical location in three-dimensional space viewed by the camera;
process the initial controller input on the client device using code specific to the video game to generate a game-specific reduced controller input, wherein the initial control input comprises more data than the game-specific reduced controller input;
communicate over a wide area network the game-specific reduced controller input to the game server located in a data center; and
receive over the wide area network, from the game server, a rendered video that reflects game progress manipulated according to the game-specific reduced controller input.

21. The computing system of claim 20, wherein the initial controller input further comprises an audio signal and the method further comprises performing speech to text translation on the audio signal and communicating the text to the game server.

22. The computing system of claim 20, wherein the generic reduced controller input is a player identification for a person described by the three-dimensional image data.

* * * * *